Oct. 14, 1969   HIROSHI ONO   3,472,105
DRAWBAR COLLET ADAPTER

Filed Feb. 29, 1968   2 Sheets-Sheet 1

INVENTOR
HIROSHI ONO
BY Wilson & Geppert
ATT'Y'S

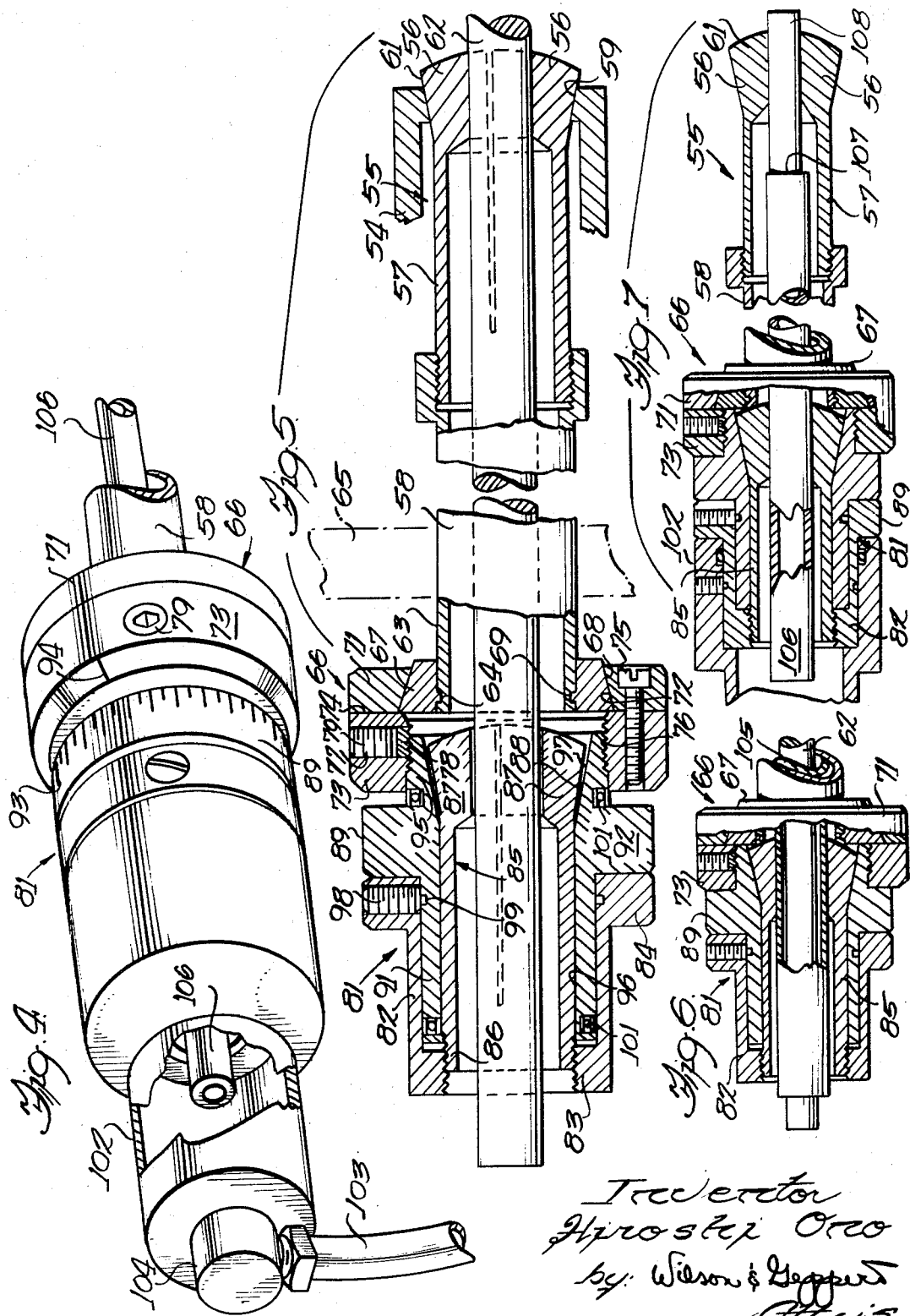

3,472,105
DRAWBAR COLLET ADAPTER
Hiroshi Ono, 4326 W. Division St., Chicago, Ill. 60651
Continuation-in-part of application Ser. No. 607,690, Jan. 6, 1967. This application Feb. 29, 1968, Ser. No. 711,828
Int. Cl. B23b 25/00, 5/22, 5/34
U.S. Cl. 82—38               10 Claims

ABSTRACT OF THE DISCLOSURE

A drawbar collet adapter for use on the drawbar of a lathe or other turning machine having a workpiece holding or gripping collet removably secured to the forward end of the drawbar and a second or guide collet of a larger size connected to the rear end of the drawbar. Where the workpiece is from a stock of indeterminate length, the rear collet acts to guide the workpiece as it extends through the drawbar and drive spindle of the machine to be gripped by the gripping collet for turning operations occurring in front of the gripping collet. The rear collet can also be used to grip the rear end of a guide tube extending through the drawbar to adjacent the workpiece gripping collet and of an inside diameter slightly larger than the work stock to aid in guiding the work through the drawbar without whipping thereof. The rear collet can also be utilized to grip an elongated stop member extending through the drawbar to adjacent the front collet and having a stop surface against which a workpiece inserted in the gripping collet will abut to accurately position the workpiece where a series of workpieces require identical machining operations. The stop member gripped by rear guide collet is adjustable relative to the front gripping collet for adjustment of the positioning of the workpieces.

---

The present application is a continuation-in-part of my copending patent application Ser. No. 607,690, filed Jan. 6, 1967, and now abandoned.

The present invention relates to a drawbar collet adapter and more particularly to a collet adapter for the drawbar of a lathe or other turning machine and fixtures where the workpiece or stock extends beyond the driving spindle with the adapter and collet maintaining the workpiece on a true center for accurate turning operations and preventing whipping of the workpiece or stock extending beyond the lathe.

In the use of lathes, automatic screw machines, grinders, etc., with an indeterminate length of material, the forward end of the workpiece or stock is fed through the drive spindle of the machine and is gripped by a collet adjacent the point of operation on the work. Where the stock extends rearwardly substantially beyond the machine and spindle, one or more suitable support means or rests support the excess stock until it is intermittently moved into the machine. As the axis of rotation for the workpiece or stock is determined at the gripping collet, any variation in height of the material or sagging or bending will result in whipping of the material both within and beyond the drive spindle. The present invention solves the problem of whipping of the material by providing a second collet at the rear end of the drive spindle to aid in supporting the workpiece or stock.

Among the objects of the present invention is the provision of a drawbar for a lathe or other turning machine actuating a collet to grip the workpiece or stock being fed therethrough for a desired turning operation and provided with a second collet at the rear end thereof to aid in supporting the stock. As collets generally are obtained in a graduated set, the two collets utilized are available at no additional cost. The next larger size collet is utilized at the rear of the drawbar with the proper collet utilized to grip the workpiece or stock during the turning operation. The nature of the set-up for the machine is such that two collet inserts of the same size are never used together.

Another object of the present invention is the provision of a drawbar for a lathe or other turning machine having a collet for gripping the workpiece or stock adjacent the turning operation and a second collet secured at the rear end of the drawbar and gripping an elongated tubular support or guide for the stock. The tubular support has an internal diameter slightly larger than the external diameter of the stock so the stock will freely pass therethrough. The tubular support extends from its rear end gripped by the rear collet through the drawbar to terminate at a point short of the front workgripping collet. This tubular support aids in preventing undesirable whipping of the workpiece or stock both within the spindle and in the portion extending rearwardly beyond the spindle.

A further object of the present invention is the provision of a drawbar for a lathe or other turning machine having a workpiece gripping collet at the forward end of the drawbar and a collet at the rear end of the drawbar gripping and retaining an adjustable backstop for a short workpiece. The backstop is utilized where accurate positioning of a series of short workpieces is required with the workpieces being inserted into the gripping collet from the front end thereof.

The present invention also comprehends the provision of a drawbar for a lathe or other turning machine having a drawbar adapter unit secured to the rear end of the drawbar and provided with an internally threaded recess. A removable collet adapter has the rear collet secured therein for gripping an elongated stop member, the collet adapter having a reduced diameter externally threaded annular extension threadingly engaging the threaded recess. The collet adapter includes a micrometer calibration on the periphery thereof cooperating with an index on the drawbar adapter unit so that the position of the stop member held by the rear collet can be adjusted by rotation of the collet adapter relative to the drawbar adapter unit and held by an adjustment lock. The stop member is preferably a tubular stop member, and a coolant unit connected to a source of coolant is secured onto the collet adapter to supply coolant through the tubular stop member to cool the workpiece and flush out chips formed in an internal boring operation.

Further objects are to provide a construction of maximum simplicity, efficiency, economy and ease of assembly and operation, and such further objects, advantages and capabilities as will later more fully appear and are inherently possessed thereby.

In the drawings:

FIG. 4 is an enlarged perspective view of another embodiment of drawbar collet adapter having a drawbar adapter unit and a removable collet adapter.

FIG. 5 is a vertical cross sectional view taken through the embodiment of drawbar collet adapter shown in FIG. 4 with the adapter utilized to guide an indeterminate length work stock therethrough.

FIG. 6 is a partial view partly in section showing the drawbar collet adapter of FIG. 4 utilized to grip a guide tube for the work.

FIG. 7 is a partial view partly in cross section of the drawbar collet adapter of FIG. 4 utilized to grip and adjustably hold a stop rod therein.

Figure 1:
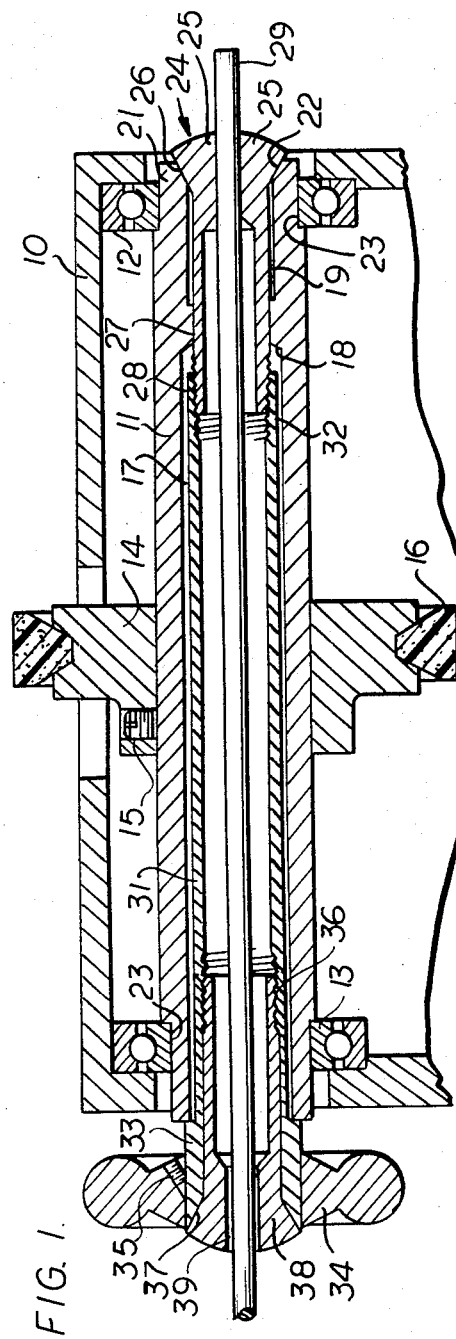
FIGURE 1 is a partial vertical cross sectional view of a lathe or other turning machine showing the drive spindle and drawbar for the work gripping collet and the collet adapter at the rear thereof.

Referring more particularly to the disclosure in the drawing wherein is shown illustrative embodiments of the present invention, FIG. 1 discloses a spindle housing 10 of a lathe or other turning machine having a drive spindle 11 mounted in spaced front and rear ball bearings 12 and 13 to rotatably mount the spindle in the housing. A pulley 14 is secured on the spindle 11 by suitable means such as the set screw 15 and is actuated by a suitable drive belt 16 driven by the machine.

The drive spindle 11 has a generally cylindrical central passage 17 therethrough which is reduced by a shoulder 18 forming a bearing surface spaced from the forward end thereof, and then of a lesser diameter at 19 to the forward end 21 which has a flared portion 22. The external surfaces at the ends of the spindle are reduced at 23 to receive the ball bearings 12 and 13 and to position the spindle in the housing 10. A collet 24 has jaws 25 with flared exterior surfaces 26 and a rearward cylindrical portion 27 with an externally threaded end 28. The exterior flared surfaces 26 of the jaws 25 cooperate with the flared portion 22 of the spindle 11 to clamp a workpiece or stock 29 therein.

A drawbar 31 has a generally cylindrical tube terminating in an internally threaded forward end 32 which cooperates with the threaded end 28 of the collet 24 and terminates in an enlarged rear end 33 extending beyond the drive spindle 11. A handwheel 34 is suitably secured to the enlarged end 33, as by a set screw 35, to rotate the drawbar and thus reciprocate the collet 24. The drawbar 31 has been modified by providing an internally threaded portion 36 spaced from the enlarged end 3 and a flared portion 37 at the rear end to receive a second guide collet 38 therein.

Collets for use on a lathe or other turning machine are supplied in a set of graduated sizes in small dimension increments so that the use of the two collets 24 and 38 incur no additional expense, as two collets of the same size are ever used together. The proper size is always available for the work-gripping collet 24 for the elongated workpiece or stock 29 and the next larger size of collet is utilized for the guide collet 38. As seen in FIG. 1, the guide collet 38 does not grip the stock 29, but has an opening 39 slightly larger than the exterior diameter of the stock to provide a guiding surface therefor. Without the giude collet 38, the stock 29 would be unsupported between the gripping jaws 25 of collet 24 and a work rest (not shown) spaced from the rear end of the drive spindle 11, and rotation of the workpiece 29 by the collet 24 and drive spindle 11 will result in a whipping motion in the unsupported portion of the stock.

The guide collet 38 being dimensionally close in size to the stock will support and guide the stock as it moves incrementally through the machine. In operation, with the stock 29 in the machine as shown in FIG. 1, the desired turning operations are performed on the stock and the finished piece is cut off. Then the rotation of the drive spindle 11 is interrupted and the handwheel 34 is rotated so that the collet 24 is moved to the right in FIG. 1 to relax the jaws 25 and release the stock. The stock 29 is then moved forward through the drive spindle 11 and collet 24 until the desired amount extends beyond the collet. The handwheel 34 is then rotated in the opposite direction to retract the collet 24 so that the jaws 25 again grip the stock and rotation of the drive spindle 11 and collet 24 is again initiated.

Figure 2:
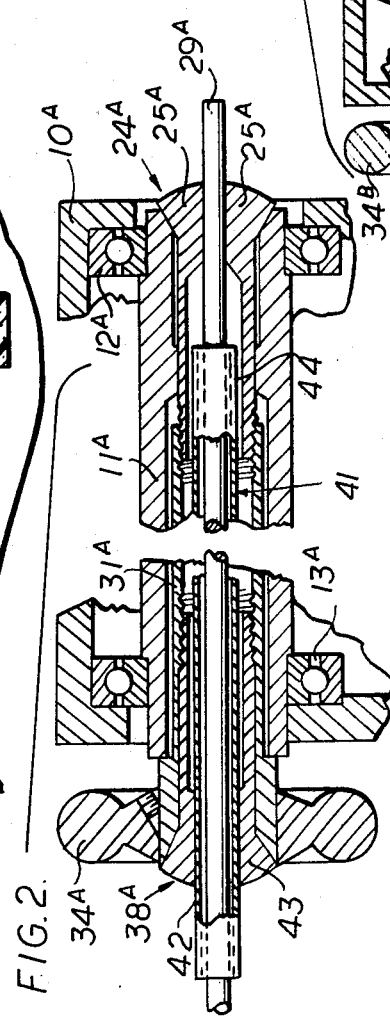
FIG. 2 is a partial vertical cross sectional view of the drive spindle and drawbar similar to FIG. 1 but with the rear collet supporting a guide tube in the drawbar.

A modification of the drawbar collet adapter of FIG. 1 is shown in FIG. 2 where a housing $10^a$ houses a drive spindle $11^a$ rotatably mounted in ball bearings $12^a$ and $13^a$ and a drawbar $13^a$ actuates a gripping collet $24^a$ and carries at its rear end a second collet $38^a$ therein. A handwheel $34^a$ is securely mounted on the drawbar $31^a$ to actuate the front collet $24^a$ for incremental feeding of the stock $29^a$ through the drive spindle $11^a$ and drawbar $31^a$. The collet $38^a$ threadingly inserted in the rear end of the drawbar $31^a$ is of a larger size than that shown in FIG. 1 to accommodate an elongated generally cylindrical tube 41 having an internal diameter slightly larger than the external diameter of the stock $29^a$.

The rear end 42 of the tube extends through and is gripped by the jaws of the second collet $38^a$, and the tube 41 extends through the drawbar $31^a$ and terminates at its forward end 44 within the first collet $24^a$ but spaced rearwardly from the jaws $25^a$. The collet $38^a$ is inserted into the rear end of the drawbar $31^a$ by a suitable tool so that the jaws 43 are tightened onto and grip the rear end 42 of the tube 41. The tube 41 not only provides a guide and support for the stock $29^a$ adjacent the rear collet $38^a$ to minimize whipping of the stock behind the machine, but also supports the stock within the drawbar $31^a$ and the spindle $11^a$ to prevent any whipping or undue vibration of the stock therein.

Figure 3:
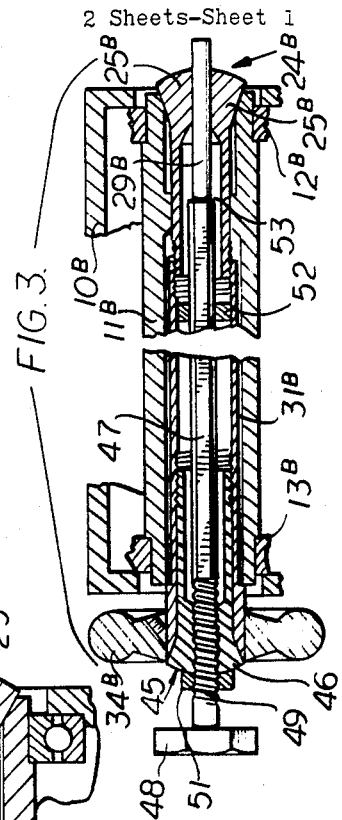
FIG. 3 is a partial vertical cross sectional view similar to FIG. 1, but on a reduced scale and showing the rear collet supporting and threadingly engaging an adjustable stop member cooperating with the front collet for accurately positioning small workpieces.

FIG. 3 discloses a further modification of the drawbar collet adapter for utilization with a short workpiece $29^b$ where the workpiece is inserted into the machine $10^b$ from the front end of the gripping collet $24^b$ and accurate repetition of positioning for multiple workpieces is required. The machine includes a housing $10^b$ rotatably supporting a drive spindle $11^b$ through ball bearings $12^b$ and $13^b$. A drawbar $31^b$ threadingly engages the gripping collet $24^b$ for the workpiece $29^b$ to reciprocate the collet causing release or engagement of the gripping jaws $25^b$ upon the workpiece. The drawbar has a threaded interior surface to receive a second collet 45 which has internally threaded jaws 46. An elongated stop member or rod 47 is received within the drawbar $31^b$ and extends within the rear portion of the front collet $24^b$.

The elongated stop member 47 has an enlarged adjusting knob 48 at the rear end with an externally threaded portion 49 adjacent the knob to threadingly engage the internally threaded jaws 46 of the rear collet 45. A lock nut 51 also threadingly engages the threaded portion 49 to lock the stop member 47 in its adjusted position. The stop member 47 extends through the drawbar $31^b$ and through a guide member 52 complementally received within the drawbar adjacent the inner end of the collet $24^b$ and terminates within the rear end portion of the collet $24^b$ in an engaging or stop surface 53 adapted to abut the inner end of a short workpiece $29^b$.

Where the turning machine is operated in a repetition of a single or multiple identical operations on a plurality of workpieces so that each piece is accurate and uniform, each workpiece must be accurately positioned for the turning operations. Using a collet, a stop member is utilized so that each workpiece can be inserted into the collet a prescribed distance and the distance will be the same for each successive workpiece. The stop member 47 accomplishes this result by use of the rear collet 45 in the drawbar which threadingly engages the stop member 47. The lock nut 51 is retracted from the collet 45 and the knob 48 rotated until the engaging or stop surface 53 is properly positioned for the desired workpiece $29^b$. Then the lock nut 51 is advanced to abut the exposed ends of the jaws 46 of the collet 45 thus locking the stop member 47 in its adjusted position. Then rotation of the drawbar causes the collet $24^b$ to grip or release each workpiece $29^b$ with the inner end of each workpiece abutting the engaging surface 53 of the stop member during the turning operation.

FIGS. 4–7 disclose another embodiment of the present invention which can be utilized in the manner of the embodiments of FIGS. 1–3 to either guide a workpiece of generally indeterminate length or to retain and position a stop member or rod where repetitive turning operations are to be performed on a series of accurately positioned workpieces. The lathe or other turning machine again includes a spindle housing having a drive spindle 54 rotatably mounted therein in front and rear ball bearing races identical to that shown in FIGS. 1–3. A suitable pulley is secured to the spindle to be actuated by a drive belt driven by a suitable motor in the machine.

A collet 55 (FIG. 5) has gripping jaws 56 and a rearward cylindrical portion 57 threadingly engaging a drawbar 58 mounted for axial reciprocation in the spindle 54. The spindle has a flared interior end surface 59 cooperating with the exterior flared surfaces 61 of the gripping jaws 56 of the collet 55 to clamp a workpiece or stock 62 therein. The drawbar 58 is a hollow cylindrical member having adjacent its rear end 63 an annular groove 64, and the drawbar is operatively connected to suitable actuating means 65 for axially reciprocating the drawbar between open and gripping positions for the collet 55.

A drawbar adapter unit 66 is removably secured to the rear end 63 of the drawbar 58 and includes a ring 67 having an outer tapered surface 68 and an inner cylindrical surface having a radially inwardly extending flange or ridge 69 engaging the annular groove 64 of the drawbar. An annular clamping ring 71 has a tapered interior surface 72 complementary to the tapered surface 68 of the ring 67 on the drawbar. A locking ring 73 has a clamping surface 74 engaging the face of both the clamping ring 71 and the tapered ring 67, and the clamping ring 71 is removably secured to the locking ring 73 by a plurality of bolts 75 or similar securing means.

The locking ring includes a cylindrical internal threaded surface 76 of a diameter greater than the diameter of the drawbar 68. Further, the ring has a radially extending internally threaded passage 77 receiving a soft metal plug 78 frictionally held in the passage and a set screw 79 outwardly thereof for a purpose to be later described.

A removable collet adapter 81 engages the drawbar adapter unit 66 and includes a cylindrical collet holder 82 having a radially inwardly internally threaded flange 83 at one end and a radially outwardly extending flange 84 at the opposite end. The internally threaded flange 83 receives the threaded end 86 of a rear or guide collet 85 having gripping jaws 87 with flared exterior surfaces 88 adjacent the rear end 63 of the drawbar 58. An adjustment member 89 has a reduced diameter rear end 91 conformably received in the collet holder 82 and terminating short of the flange 83. The central enlarged portion 92 of the member has equally spaced calibration 93 on the periphery thereof cooperating with an index mark 94 on the locking ring 73 of the drawbar adapter unit 66.

The member 89 also has a reduced diameter forward end 95 which is externally threaded and is conformably received and threadingly engages the internally threaded cylindrical surface 76 of the locking ring 73, and this member has a generally cylindrical passage 96 therethrough with a flared surface 97 at the forward end to conformably receive the rear collet 85. A set screw 98 extends radially through the flange 84 of the collet holder 82 to engage in annular groove 99 on the outer surface of the rear end 91 of the member 89 to allow relative rotation therebetween but prevent axial movement. Also suitable sealing rings 101 are provided between collet holder 82 and adjustment member 91 and between member 91 and the locking ring 73.

As seen in FIG. 4, a removable coolant unit 102 may be secured onto the outer surface of the holder 82 by suitable means and sealed by O-rings to provide for the passage of a coolant or air into the collet adapter 81 and the drawbar adapter unit 66 and drawbar 58 if desired; the coolant or air entering through hose 103 and the rotatably mounted and sealingly engaging adapter 104 at the outer end of the coolant unit 102.

As seen in FIG. 5, the collet adapter 81 and drawbar adapter unit 66 with the rear collet 85 can be utilized to act as a guide for a workpiece 62 of an indeterminate length as it passes through the drawbar 58 and spindle 54 to be intermittently gripped by the front collet 55 for one or more turning operations. Also, as seen in FIG. 6, the collet 85 can grip a guide tube 105 which extends into the drawbar 58 to adjacent the front collet 55 in the same manner as seen in FIG. 2 to guide a workpiece 62 of indeterminate length extending therethrough.

Furthrmore, as seen in FIG. 7, the rear collet 85 can grip and retain an elongated stop member 106, which can be a solid stop rod or a hollow tubular stop member, that extends from the rear collet through the drawbar 58 to terminate in a stop face or surface 107 at a predetermined position relative to the front collet 55 so that a short workpiece 108 can be inserted into the collet 55 to abut the face 107 of the stop member 106, thus providing a fixed point for a series of identical workpieces involved in one or more repetitive operations. The set screw 79 is screwed inward to force the metal insert 78 against the threaded forward end 95 of the adjustment member 89 to retain the member 89, the collet holder 82 and the rear collet 85 in an adjusted position.

To alter the adjustment of the stop member 106 held by the collet 85, the set screw 79 is loosened and the member 89 is rotated in either direction so that the threaded engagement between the threaded forward end 95 of member 89 and the threaded surface 76 of locking ring 73 provides an axial movement of the collet adapter 81 relative to the drawbar adapter unit 66 to alter the position of the stop member 106 relative to the front collet 55. The scale 93 on the member 93 is calibrated to the threaded engagement between member 89 and the locking ring 73 to indicate the extent of axial movement of the stop member 106; the calibration being shown opposite the index 94 to indicate the increment of movement of stop member 106. When the stop member has been shifted to its new position, the set screw 79 is again tightened to retain the collet adapter 81 in its adjusted position.

When the stop member 106 is a hollow tubular member, the coolant unit 102 may be utilized with the coolant passing through the coolant unit 102, the guide collet 85, and the tubular stop member 106 to the drive collet 58 and workpiece 62 so that the coolant will cool the workpiece and flush out any chips from the stop member, the drive collet and/or the workpiece during and on completion of a turning operation. This is especially useful where a drilling, reaming or other operation is performed through the workpiece. Also, where boring operations are not performed on the workpiece, the tubular stop member 106 may have slots formed therein adjacent the stop face 107 to allow flow of coolant into the drawbar and around the workpiece.

While a drawbar collet adapter in a drive spindle of a particular and effective shape has been shown and described by way of illustration, it is not my desire to unnecessarily limit the scope or the utility of the improved features by virtue of these illustrative embodiments.

Having thus disclosed my invention, I claim:

1. In a turning machine having a hollow drive spindle with a drive collet mounted in one end thereof to grip a workpiece for turning operations thereon adjacent the collet and spindle, a hollow drawbar having an open rear end and terminating at the forward end in an externally threaded end engaging the rear end of the drive collet, a drawbar adapter unit and a collet adapter operatively connected together, said collet adapter and drawbar adapter unit having a central passage therethrough, a guide collet received in said central passage, said drawbar adapter unit and said collet adapter operatively connected to the rear end of said drawbar.

2. A turning machine as set forth in claim 1, in which said collet adapter includes an adjustment member having said central passage with a flared end to receive said guide collet, and said drawbar adapter unit includes a locking ring secured to said drawbar and having an internally threaded surface, said adjustment member having a forward externally threaded end of reduced diameter threadingly engaging the threaded surface of said locking ring, and an adjustment lock on said locking ring to retain said adjustment member in a predetermined position.

3. A turning machine as set forth in claim 2, including a hollow tubular guiding member gripped adjacent one end in said guide collet and extending into the drawbar to terminate short of said drive collet, said tubular member receiving and guiding the workpiece of an indeterminant length.

4. In a turning machine having a hollow drive spindle with a drive collet mounted in one end thereof to grip a workpiece for turning operations thereon adjacent the collet and spindle, a hollow drawbar having an open rear end and terminating at the forward end in an externally threaded end engaging the rear end of the drive collet, a drawbar adapter unit, a removable collet adapter, said drawbar adapter unit including a locking ring secured to the rear end of said drawbar and having an internally threaded surface, and said removable collet adapter including an adjustment member having a central passage therethrough with a flared end, a guide collet received in said central passage and operatively connected to said collet adapter, a forward externally threaded end of reduced diameter on said adjustment member threadingly engaging the threaded surface of said locking ring, an adjustment lock on said locking ring to retain said adjustment member in a predetermined position, and an elongated stop member gripped at one end by said guide collet and extending through said drawbar to terminate in a work engaging surface.

5. A turning machine as set forth in claim 4, in which said locking ring has an indexing mark and said adjustment member has a scale on the periphery thereof, said scale being calibrated to axial movement of the stop member upon rotation of the adjustment member relative to said locking ring.

6. A turning machine as set forth in claim 4, in which said elongated stop member is a hollow tube having a central passage adapted to receive a supply of coolant for cooling and flushing said drive collet and workpiece.

7. A turning machine as set forth in claim 4, in which said guide collet has a rearward externally threaded end, and said collet adapter includes a collet holder rotatably mounted on said adjustment member, said collet holder having an internally threaded end spaced from the flared end of the adjustment member to threadingly engage the rear end of the guide collet.

8. In a turning machine having a hollow drive spindle with a drive collet mounted in one end thereof to grip a workpiece for turning operations thereon adjacent the collet and spindle, a hollow drawbar having an open rear end and terminating at the forward end in an externally threaded end engaging the rear end of the drive collet, a drawbar adapter unit secured to the rear end of the drawbar, a collet adapter operatively connected to said drawbar adapter unit and having a central passage therethrough, a guide collet operatively connected to said collet adapter and received in said central passage, and means for cooling and flushing said drive collet and workpiece.

9. A turning machine as set forth in claim 8, in which said cooling and flushing means includes a hollow member sealingly engaging said collet adapter, a source of coolant, and an adapter sealingly rotatably mounted in said hollow member and having a passage communicating between said source of coolant and said hollow member.

10. In a turning machine having a hollow drive spindle with a drive collet adapted to grip material extending into said spindle for turning operations thereon, a hollow drawbar having an open rear end and terminating at the forward end in an externally threaded end engaging the rear end of the drive collet, a guide collet secured within the rear end of said drawbar, said guide collet and drive collet being selected from a set of similar collets and said guide collet having an internal diameter larger than that of said drive collet, and an elongated tubular guide member supported by and gripped adjacent one end in said guide collet and extending through said drawbar to and terminating within said drive collet, said material being of an indeterminant length to extend through and be supported by said tubular guide member, said tubular guide member having an internal diameter slightly larger than the external diameter of said material.

References Cited

UNITED STATES PATENTS

| 1,455,554 | 5/1923 | Stercklen. | |
| 1,885,224 | 11/1932 | Brinkman et al. | 82—38 XR |
| 2,756,059 | 7/1956 | Knapp. | |
| 3,162,315 | 12/1964 | Holden | 82—38 XR |

FOREIGN PATENTS 529,002   8/1921   France.

LEONIDAS VLACHOS, Primary Examiner

U.S. Cl. X.R.

279—1